Sept. 11, 1951 J. DE MENT 2,567,877
ELECTROCHEMICAL BONDING OF ALUMINUM WITH OTHER MATERIALS
Filed July 11, 1947
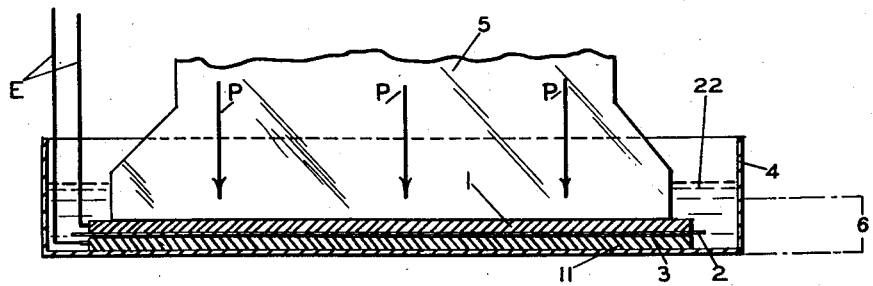
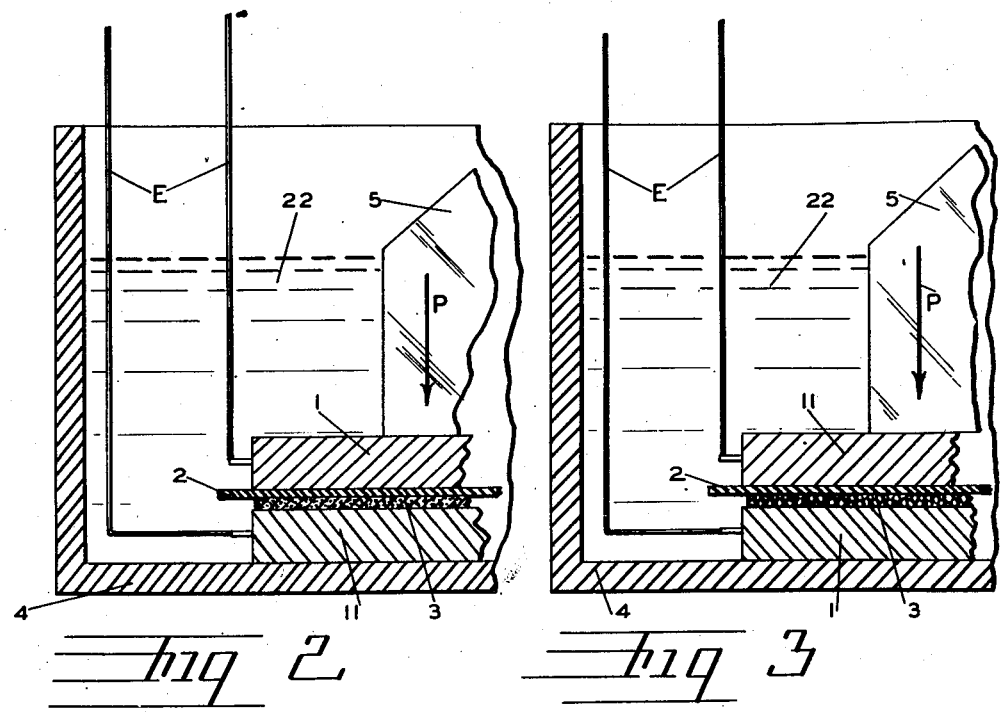
INVENTOR Patented Sept. 11, 1951

2,567,877

UNITED STATES PATENT OFFICE 2,567,877

ELECTROCHEMICAL BONDING OF ALUMINUM WITH OTHER MATERIALS

Jack De Ment, Portland, Oreg.

Application July 11, 1947, Serial No. 760,331

3 Claims. (Cl. 204—16)

This invention relates to methods for the electric and electrochemical union and bonding of certain anodizable metals and alloys, particularly aluminum, with other materials such as particles and fibers, e. g., luminescent solids, glass and other materials, including metals.

It is an object of this invention to make possible a simple and superior method for the preparation of articles of aluminum which have a surface to which is joined another substance in powder or fibrous form with specific and special properties, e. g., radioactivity, electron emissivity, and so on.

It is among the objects of my invention to make available a wholly inorganic, metallic phosphor screen that is suitable to withstand high temperatures, rough handling and evacuation for application to cathode ray tubes, television tubes, radar tubes and the like.

It is also an object of this invention to provide methods whereby certain sheet-form substances like paper and asbestos can be bonded to an aluminum surface without requiring the employment of special cement or high temperatures.

It is an object of this invention to provide an improved method for the production of catalytic surfaces which must withstand the rigors of high temperature and pressure and chemical action in the petroleum and chemical industries and arts. In such instances catalysts which can be firmly bonded to an aluminum surface include the so-called "blacks" of the platinum metals group of elements, or other finely comminuted catalytic agents well known in the art, as desired.

It is among the objects of my invention to provide a superior method, whereby large metallic surfaces may be treated so as to possess an abrasive characteristic. Thus, relatively large surfaces carrying industrial diamond or bort particles, as well as synthetic abrasives like corundum, silicon, tungsten and other carbides, can be prepared easily and economically. By slight departure in geometry, bits and cutting tools suitable for machine work, rock and oil drilling and the like can be fabricated by the methods herein set forth.

It is among the objects of this invention to make available a method whereby anodizable metal or alloys thereof, such as aluminum and the alloys well known in the art, may be coated with glass in the form of particles or in the form of glass fabric, such coating being made in the absence of high temperature and special cements, completely of an inorganic nature, should this be desired, and possessing great strength of union.

In short, it is a prime object of this invention to make available a method whereby a large number and wide variety of materials of different forms may be electrochemically bonded in the absence of high temperature to an aluminum or like metal surface.

Referring to the accompanying drawings which form a part of the present disclosure:

Figure 1 shows in side elevation a typical assembly or apparatus arrangement whereby the present invention is produced, in which the numeral 5 represents a force-exerting member, with lines of force or direction of pressure indicated by the arrows, 5, as set forth infra; the numerals 4 designate a container, within which is assembled and submerged in or wet by an electrolyte, 22, anodizable members 1 and 11, separated by elements 2 and 3, the character of which is described hereinafter. The letter E designates electric leads or conduits from a battery or like source of electrical energy, also described below.

Throughout the drawings the arrows P stand for directional pressure or force, via the agency of a force exerting member; and, the numeral 6 refers to a portion of Figure 1, which is shown in more detail in the following figures:

In Figure 2, the numerals 1 and 11 designate anodizable material such as aluminum; 2, a separator, of nature disclosed below; 22, an electrolyte; 3, a particular material to be anodizably bonded to 11 or to 1, as desired, and also explained hereinafter; 4, a container for the assembly of members and components, preferably of inert material such as enamelware; 5, a force-exerting face-part of the pressure producing system shown in Figure 1, or to a weight or like pressure producing system; E, to electric leads to 1 and 11 members.

Figure 3 illlustrates in side-elevation, and with some exaggeration for purposes of clarity, that portion of Figure 1 indicated by the numeral 6. In Figure 3, which is like Figure 2, the assembly differs from the latter in that it is directed to the anodizative union of a material like glass fabric or fibers, shown by the numeral 3, with an aluminum surface;

Other details in the accompanying figures are fully described subsequently, particularly with reference to equivalents for the means by which the invention is produced and the optional parts of the illustrative system shown therefor.

It is well known in the art that certain metals, on exposure to the atmosphere, acquire an extremely thin film of oxide coating which sometimes acts to protect the surface of the metal from corrosion. Also, this process of oxidation is enhanced under suitable conditions, as when electric energy is present. In the case of aluminum the electrochemical formation of an oxide coating on an aluminum surface is known as anodization, a process long known and used for the treatment of aluminum, and less frequently for the treatment of the metals zirconium, titanium, tantalum, and certain alloys thereof.

Either alternating or direct current can be used, and the potential may vary between wide limits. With alternating current both electrodes are often of the metal to be anodized, say aluminum or alloy thereof, and are suspended within electrolyte. For small set-ups, a three to five liter jar, with two or three liters of electrolyte, proves convenient. With this arrangement, 110 volt, alternating current can be used, after it is suitably reduced to say 70 volts, by means of a step-down transformer or a 150 watt tungsten filament lamp in series in the power line. The electrolyte consists of say 40 grams of oxalic acid dissolved in a liter of water. With alternating current the aluminum articles to be anodized must be used in pairs, to provide anode and cathode terminals, and also the aluminum must be of the same composition in the case of alloys. The aluminum must be thoroughly scrubbed beforehand, and foreign metal must be absent from the bath. The current is applied for a period of between 15 minutes and one hour, depending upon the thickness of the coating desired, and the temperature of the solution should be kept at about room temperature, less than about 30 degrees centigrade.

The voltage range may range up to about 700 volts for either alternating or direct current, and the temperature may go as high as 100 degrees centigrade, and anodic coatings will still be obtained, though care must be taken to keep the voltage below the point at which luminescence or a spark discharge takes place. The period for the anodic coating may vary between several minutes and several hours, and time is usually not considered overly significant unless quantitative work is being carried out. Fifteen to 30 minutes may be considered an optimum value in most cases.

The electrolyte may also consist of a variety of substances at different concentrations, but usable examples are as follows: Oxalic acid, citric acid, sulfuric acid, borax, phosphoric acid, chromic acid, and the like at concentrations between a few tenths of a per cent and up to 10 and sometimes as high as 60–80 per cent. Usually a 0.5 to several per cent concentration will prove best and most economical.

It has been found that for hard anodized coatings a 10 per cent sulfuric acid solution proves suitable, but that for soft coatings a 70 per cent sulfuric acid solution functions well. In this case the aluminum is made the anode with an applied potential of 15 volts, direct current, and the temperature maintained between 15 and 30 degrees centigrade. A coating is formed by using 3 per cent chromic acid, free from sulfates or chlorides, and the voltage is gradually increased from zero to 50 volts.

The current density is not considered extra important, for the electrochemical process can be considered more or less self-regulating in that the formation of the aluminum oxide film on the aluminum prevents the development of high amperage during anodizing, perhaps in a sense acting as a very high resistance, as the dielectric constant of aluminum oxide is known to be great, and the current density fluctuates when the current is taken from a power line, for there is considerable variance between the results of different workers. It is often the practice to neglect current densities and emphasize potential. However, by way of illustration, a current density of 10 to 100 amperes per square foot of electrode material has been given as optimal for a 10 to 20 minute run, and with a boric acid-borax electrolyte, with a line voltage of 225, suitable coatings have been formed when the current density varied from a few-tenths of an ampere per square decimeter to 10 amperes per square decimeter. All coatings were completed in 10 minutes. With an electrolyte consisting of sodium hydroxide (20 grams), water (1 liter) and glycerine (150 cubic centimeters), suitable oxide coatings are formed at 10–15 volts, with a current density of 18 to 24 amperes per square foot at 15–25 degrees centigrade.

Briefly, electrochemical union is made possible by the "pressure anodization" of aluminum or like metal or alloy with the bondable substance, whether in fine particle form, fibers, fabric, sheets, or the like, in intimate contact therewith. After suitable anodization under moderate pressure the two or more materials, including at least one anodizable metal surface like that of aluminum are united, essentially cemented by a layer of aluminum oxide of high strength and chemical and physical durability.

The pressures which I have found expedient range between fairly wide limits, say from the employment of 15 p. s. i. (pounds per square inch) up to several hundred p. s. i. of rigid electrode surface, and, finally up to several tons pressure per square inch of electrode surface. Thus it is apparent that 15 p. s. i. may be regarded as a minimum, though this is not to say that my invention will not function perhaps imperfectly at lower forces, though superior results are obtained when the force is greater than this value. With mechanical pressure means forces of up to several hundred p. s. i. prove very satisfactory for most work and with practically all materials where extraordinary strength requirements are not required or in evidence. Between 50 and 100 p. s. i. is all that can be tolerated by many phosphors, though the durable ortho-silicates, those of zinc and beryllium for example, can withstand many times this. In the case of manufacture of abrasive wheels and surfaces hydraulic presses provide the large forces which are necessary to bring the abrasive particles into intimate contact with the electrode surface whereupon they can undergo the cementitious process involved in anodic oxidation. In these instances it may also be desirable to partly embed, by large pressures, the abrasive particles into the electrode surface either before anodic oxidation or during same. When the electrode member surface has been abrased such procedure is optional, for in general lesser forces will accomplish similar results.

Further, distinction must be made in this invention in regard to the sequence of operations and the modifications and departures thereof which can be undertaken. In general these are classified on the basis of when the force means is brought into application in relationship to the employment of the anodic oxidation, effective to secure cementing and bonding. The approximate time distinctions are as follows: (1) The force means is maintained during the time of anodic oxidation; (2) the force means is applied prior to the anodic oxidation, and not during same, and (3) the force means is applied both before the anodic oxidation and maintained concurrently therewith after anodic oxidation has started.

These distinctions set forth departures which can be made to achieve manufacture of different products by my invention. Of the three set forth supra, (1) and (3) are preferred, and (2) is optional, as desired, but considered herein of limited utility.

Whereas it is anticipated that a smooth, plane and chemically cleaned and polished aluminum electrode surface will fulfill most of the applications of my invention, it is evident that variegated surface treatment can be given the aluminum or like metal or alloy for special forms of this invention. Thus, an electrode surface may be provided with a multitude of fine scratches or abrasion-marks, say by use of an abrasive powder or paper, the magnitude of the abrasive marks, for example corresponding to the particle size of a material desired for bonding to the electrode surface. In this instance the particles to be bonded will fill in the abrasion marks, and provide a plane, more or less, uniform surface which is characterized as having a greater thickness at some parts of the bonded material. I have found that in the case of particles like phosphors that the bonding is stronger, for there is more area of the particle exposed to the anodically formed aluminum oxide and the cementing process is therefore more thorough.

As an alternative, acid etching may suffice to provide a rough aluminum surface. Likewise, sand blasting proves expedient. Mechanically, a thin sheet of aluminum can be scored by a point or pressed by dies to provide distinctive patterns on the surface. In use of a "point" a steel brush provides a plurality of scratch marks or microscopic valleys in the aluminum surface.

As to the choice of the electrolyte the matter is optional so long as the electrolyte does not corrode the aluminum or adversely affect the material to be bonded. A ten per cent salt solution, or oxalic acid, borax or other materials known to be electrolytes prove satisfactory. It is apparent that proper selection of the electrolyte must be made in certain instances, out of consideration for the nature of the powder or particles or other material to be bonded, e. g., chromic and sulfuric acids are not preferred where an organic substance is to be bonded or where the material will be attacked and altered under the conditions of anodic oxidation. By preference, inorganic salts and organic acids in water prove satisfactory electrolytes for most materials.

In the matter of the powder, a very large number and wide variety of substances, depending upon the product desired, can be efficaciously employed in this invention. It is not possible to name all such materials, but in the accompanying table, and hereinafter, illustrations will be set out as representative of the broad novelty of this invention.

Luminescent solids, further discussed subsequently, and often called phosphors, may be taken as one good example of finely divided, particular, comminuted or reduced forms of almost any material that can be similarly employed so long as the conditions of anodization do not adversely affect the substance being worked and bonded.

*Table*

| Substance | Suggested Uses |
|---|---|
| Phosphors, visible light | Cathode ray tubes, television tubes, radar tubes. |
| Phosphors, radioactive-auto-excited. | Instrument dials, figures. |
| Phosphors, infrared sensitive | Sniperscopes, Icaroscopes. |
| Phosphors, X-ray and ultra-violet. | Wavelength changes for fluoroscopic screens, intensifying screens, light sources. |
| Corundum gems, ruby and sapphire. | Abrasives, fine bearings, novelty, decorative. |
| Diamond | Abrasive surfaces. |
| Platinum metal "blacks") | Catalytic surfaces. |
| Glass | Reflective, protective, decorative coatings. |
| Silica | Same. |
| Tungsten, silicon and like carbides. | Abrasive surfaces. |
| Natural gems, colored | Esthetic, novelty. |
| Radioactive substances | Gamma, beta, neutron and other radiation sources. |
| Electron emitters | Electron tubes. |
| Photosensitive substances | Photoelectric tubes, all metal photographic plates, light indicators, iconoscope screens. |
| Metallic soaps | Special properties thereof, lubrication, catalysis, antifouling, anticorrosion, waterproofing, etc. |

I have successfully made brilliantly luminescent phosphor-aluminum screens using phosphors between 300 and 400 mesh fineness with very simple pressure anodizing assemblies, and with a phosphor like zinc ortho-silicate the screen withstands severe scratching and abrasive action, bending, temperatures near the fusing point of aluminum and other highly rigorous chemical and physical conditions that would ordinarily destroy any of the customary luminescent screens. In use of phosphors, the alkaline earth metal and zinc and cadmium sulfides prove of limited value, as the material is dissociated and metallic zinc is usually plated out, and in other instances the sulfide breaks down. Therefore, the best screens are made with silicates, phosphates, tungstates (calcium and magnesium) and the like.

In the pressure anodization production of screens in which a layer of particles like phosphor, glass, corundum or other comminuted substance is electrochemically united to an aluminum surface I have found that best results are obtained by using pure aluminum, although one can also use aluminum alloys, with magnesium, silicon, zinc, manganese, nickel, silver or other metals in which the designation aluminum alloy is the general term used in the art to cover aluminum-base alloys, such as up to 8 per cent copper and other metals, as desired. High grade aluminum manufactured in sheet thickness of 0.006-inch proves very satisfactory for making phosphor or other screens should a light, pliable and easily worked product be desired.

While phosphor screens can be prepared with little or no pressure, by merely keeping the phosphor or other powder in intimate contact with the anodizable surface, this is not preferred for purposes herein, since the product is neither uniform nor highly durable in most cases. In applying the powder to an electrode face, such as aluminum, a dry pulverant form may be used, or, preferably, a thick paste made from the powder and water or a small amount of electrolyte, this being painted uniformly over the aluminum just prior to careful assembly of the apparatus for an electrochemical run. The particle size is not critical below certain finenesses, and in general the finer the powder the more satisfactory the product. Screens can be prepared with fairly coarse powders, say of 100 mesh, but it is preferred to use powder below at least 200 mesh, and more preferably of about 300–400 mesh or finer if the product to be united with aluminum can be conveniently obtained in that mesh size.

In the electronic industries conductive materials like metals, graphite, photosensitive and electron emissive substances, and other material for use in Geiger tubes, photocells, electron tubes and the like, may be used in particular form instead of a phosphor.

The so-called "blacks" of the platinum metals family, e. g., platinum, osmium, palladium, iridium, ruthenium and so on, which are known to be valuable catalysts, can be bonded to an aluminum surface for use in the petroleum and chemical industries for high temperature and pressure catalysis. Other metals and salts thereof, e. g., Ni, Cu, V, Zn, Cr, manganese dioxide, nickel oxide, vanadium pentoxide, may also be used in my invention.

Particles of synthetic corundum, in the form of say ruby or sapphire, for novelty or abrasive coatings, and substances with selective reflection and absorption or other distinctive optical properties, for mirrors and the like, can also be employed in the form of this invention. Many other choices of particular or comminuted materials will be apparent, but these are a few examples which illustrate the present invention as a broadly novel advancement in the art.

In all of the accompanying drawings, Figures 1, 2 and 3, the meniscus or level of the electrolyte is illustrated as completely submerging all of the electrode and other members in the pressure assembly, excepting the force-exerting member. For certain purposes this arrangement can be followed to advantage, but for other purposes the meniscus should be properly regulated so as to avoid excessive anodization over undesired regions and areas of electrode material. Thus, in bonding the surface of the electrolyte may not be permitted to exceed the surface face-level of the upper-most electrode member in the assembly, but just submerging the separator together with the lower-most electrode. In such a case all exposed portions of the lower-most electrode may be anodized, and if this is not desirable, the arrangement and sequence of members, separator and material to be bonded for example, will be reversed.

Special dies, forms, molds or the like may also be used in this invention if plane sheets of bonded material are not produced. In such instances the materials of which the molds, dies or supports are fabricated are chosen out of consideration of the requirements of an anodic oxidation system, all of which is well known to those skilled in the art, and which knowledge has been briefly outlined herein. Thus, cones, hemispheres, tubes, cylinders, and the like may be bonded or coated on the outside surface or within. For the edge surface, whether plane, beveled or otherwise formed for special purposes, as for example in drill and saw cutting tools and edges, similar procedures are followed with the use of rigid, supporting forms so that the force will be translated into bringing into contact the material to be cemented.

As is evident, granules, fine particles, and like forms of electrode and/or anodically oxidizable metal may be employed for special applications of this invention. This holds true so long as the requirements of pressure and anodic oxidation are maintained. Members may be fabricated by methods of powder metallurgy, printed, painted, or otherwise applied in different forms to other substances, and the like.

In the present invention the simplest explanation seems to be that the particles of say phosphor, or fine fibers of say asbestos, placed under moderate force in intimate contact with a clean, plane anodizable metal surface like aluminum, are "trapped" or bonded to the metal surface by the growth of columns of alumina about the irregular base portions of particles or about the lower part of a fiber, cementing the particles or fibers strongly into the alumina coating. If the anodization is continued sufficiently long, the oxide builds up and creeps in and about the particles or fibers, finally over them in many instances, so that they actually become enveloped or embedded in the coating, on the one hand, and, on the other, eventually form a consolidated and tightly cemented layer-mass.

The anodically oxidized coating of aluminum oxide possesses a glass-like hardness in many instances, but is water and acid resistant, forming an integral part of the metal.

I claim:

1. The method of attaching an inert material having a penetrable surface into which anodic aluminum oxide can grow and interlock to an aluminum base which comprises placing the inert material in contact with the said aluminum base, immersing the inert material in contact with the aluminum base in an aqueous electrolyte, applying pressure on the said material and rigidly supporting the said aluminum base, said pressure being sufficient to prevent the displacement of the inert material from the aluminum base, placing an electrode member in the said electrolyte, making the aluminum base the anode and the said electrode member the cathode of an electric circuit, electrically forming an aluminum oxide growth on said aluminum base, and continuing the electrical formation of the said aluminum oxide growth until the said inert material is attached to the aluminum base by growth of anodic oxide therebetween.

2. The method of attaching a layer of solid particles to an aluminum base, which comprises placing a layer of solid particles in contact with the said aluminum base, applying pressure on the layer of solid particles and against the opposite side of the said base sufficient to prevent displacement of the said layer from the said base, in the presence of an aqueous electrolyte, connecting the aluminum base to the anode pole of an electric circuit having the cathode thereof submerged in the electrolyte, causing anodic oxide of aluminum to grow between the particles of the said layer to lock same to the aluminum base.

3. The method of attaching a fibrous substance to an aluminum base, which comprises placing the fibrous substance in contact with the said aluminum base, applying pressure on the fibrous substance and against the opposite side of the said base sufficient to prevent displacement of the fibrous substance from the said base, in the presence of an aqueous electrolyte, connecting the aluminum base to the anode pole of an electric circuit having the cathode thereof submerged in the electrolyte, causing anodic oxide of aluminum to grow between the fibers of the fibrous substance to lock same to the aluminum base.

JACK DE MENT.

REFERENCES CITED

The following references are of record in the file of this patent:

UNITED STATES PATENTS

| Number | Name | Date |
|---|---|---|
| 1,739,657 | Shemitz | Dec. 17, 1929 |
| 1,974,140 | Irion et al. | Sept. 18, 1934 |
| 2,104,018 | Brennan | Jan. 4, 1938 |
| 2,141,377 | Chylinski | Dec. 27, 1938 |
| 2,214,876 | Clark | Sept. 17, 1940 |
| 2,231,373 | Schenk | Feb. 11, 1941 |
| 2,298,113 | Ely | Oct. 6, 1942 |
| 2,306,082 | Prest | Dec. 22, 1942 |
| 2,424,140 | Beecher | July 15, 1947 |
| 2,424,995 | Miller et al. | Aug. 5, 1947 |

FOREIGN PATENTS

| Number | Country | Date |
|---|---|---|
| 588,528 | France | Feb. 2, 1925 |